No. 690,628. Patented Jan. 7, 1902.
A. C. BADGER.
RANGE BOILER.
(Application filed Feb. 10, 1900.)
(No Model.)
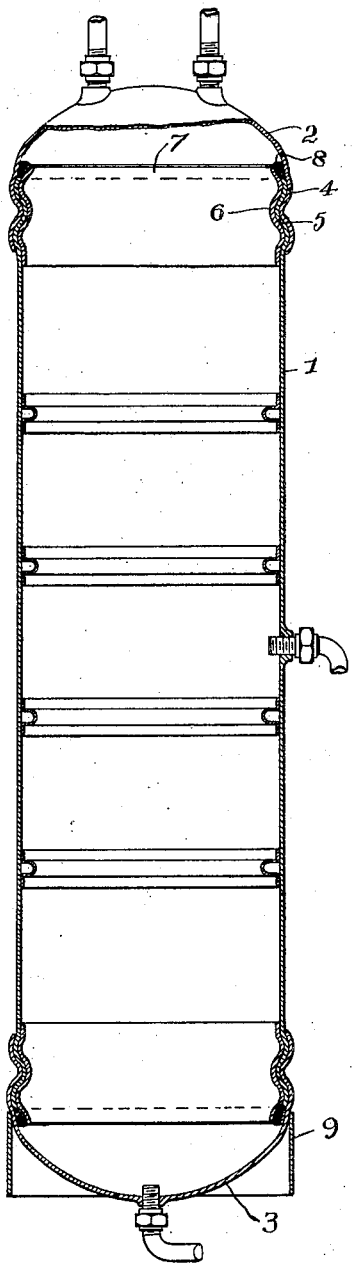
Witnesses:
Inventor:

UNITED STATES PATENT OFFICE.

ARTHUR C. BADGER, OF BOSTON, MASSACHUSETTS.

RANGE-BOILER.

SPECIFICATION forming part of Letters Patent No. 690,628, dated January 7, 1902.

Application filed February 10, 1900. Serial No. 4,759. (No model.)

*To all whom it may concern:*

Be it known that I, ARTHUR C. BADGER, of Boston, in the county of Suffolk and State of Massachusetts, have invented certain new and useful Improvements in Range-Boilers, of which the following is a specification.

This invention relates to domestic range or water-heating boilers; and its object is to provide a strengthened and reinforced joint of a novel character in boilers of this kind. The invention consists in certain novel features of construction and arrangement hereinafter described and claimed.

The accompanying drawing represents a vertical sectional view of a boiler constructed in accordance with my invention.

1 is the cylindrical portion or body of the boiler-shell, and 2 3 are the top and bottom heads, respectively. Referring to the joint between the body 1 and the top head 2, the same is constructed with two outer layers 4 5, consisting of the overlapping edges of said body and head, and an inner third layer consisting of a sheet-metal reinforcing annular band or ring 6, one edge of which extends beyond the edge of the body layer 5. The three layers are conformably beaded or corrugated circumferentially to maintain a secure hold upon each other against longitudinal separating strains, and a tight joint is secured by introducing solder between the layers of the joint. It is to be noted that a marginal lip 7 is turned inwardly on the upper edge of the reinforcing-ring 6, leaving a space 8 between it and the head 2, at the bottom of which space is located the upper edge of the middle or body layer 5. Since the edge of the inner layer projects or extends beyond the edge of the body layer 5, the space 8 is formed beyond the edge of said body or intermediate layer 5 and between the extended edge of the inner or ring layer 6 and the inner surface of the outer layer 4. The preferred method of soldering the joint is to introduce a ring of solder which shall occupy the space 8 when the parts are fitted together and then by applying heat to the outside of the boiler melt the solder and cause it to flow into the crevices between the three layers 4 5 6 of the joint. Owing to the fact that the three layers are conformably beaded and corrugated, so as to be in close contact throughout the overlapped portion, there is practically no opportunity for the escape of the solder from between the crevices mentioned. In this way the parts 1 and 2 to be joined are firmly united to each other and to the reinforcing-ring. The sheet-metal reinforcing-ring strengthens the joint, while at the same time retaining compactness and lightness therein.

The above construction is applicable to the joints at both ends of the boiler or elsewhere thereon and is carried out at the lower end the same as at the upper end, as seen in the drawing. In addition a ring 9 may be soldered externally to the lower end of the boiler to serve as a base.

I claim—

In a range-boiler, a joint having two outer layers consisting of the overlapping margins of the shell parts to be joined, and an inner third layer consisting of a sheet-metal reinforcing-ring having one edge extending beyond the edge of the adjacent or intermediate layer, all of said layers being conformably beaded or corrugated and in close contact throughout their overlapped portions, and a filling of solder in the space beyond the edge of the intermediate layer and between the extended edge of the inner layer and the inner surface of the outer layer.

In testimony whereof I have affixed my signature in presence of two witnesses.

ARTHUR C. BADGER.

Witnesses:
P. W. PEZZETTI,
R. M. PIERSON.